United States Patent Office 3,485,657
Patented Dec. 23, 1969

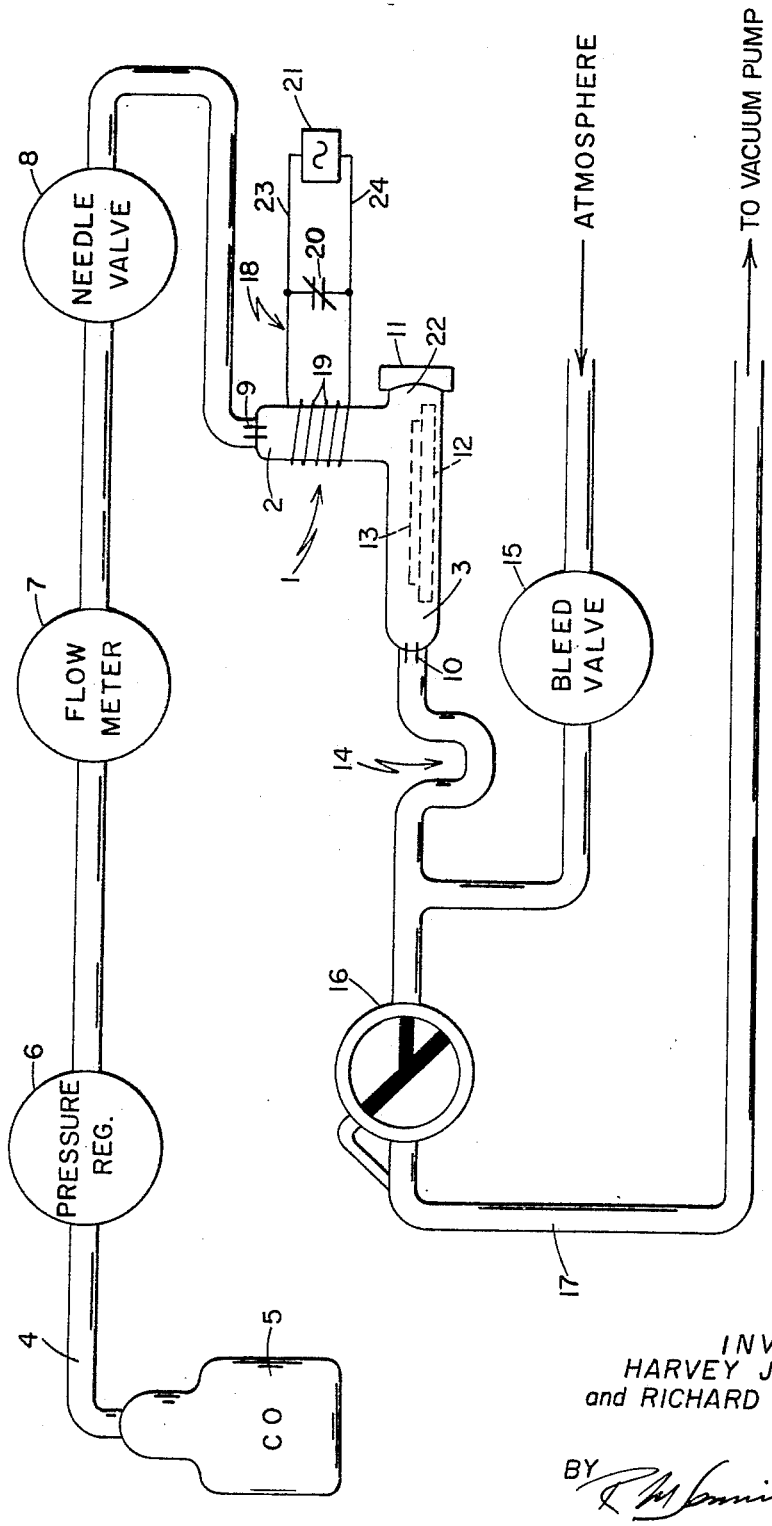

3,485,657
CARBON COATING EMPLOYING
ELECTROMAGNETIC FIELD
Harvey J. Beaudry, El Sobrante, and Richard L. Bersin,
Berkeley, Calif., assignors to LFE Corporation, Boston,
Mass., a corporation of Delaware
Filed Mar. 14, 1967, Ser. No. 623,013
Int. Cl. C23c 9/06
U.S. Cl. 117—46                                    1 Claim

ABSTRACT OF THE DISCLOSURE

A gaseous compound, such as carbon monoxide, is fed to a reaction vessel to which an intense high frequency electromagnetic radiation field is applied. The high frequency field is produced by a crystal controlled RF oscillator and coupled to a first portion of the reaction vessel by means of a resonant tank circuit. As the carbon monoxide passes through the reaction chamber, the energy provided by the high frequency field is coupled to the atoms and molecules thereof in sufficient quantity to break down the carbon monoxide into, among other products, elemental carbon and molecular oxygen. A cryogenic trap is provided downstream from the reaction chamber and acts in conjunction with a vacuum pump to remove from the reaction chamber the molecular oxygen along with the unreacted carbon monoxide. The material to be carbon coated is inserted into a material handling portion of the reaction chamber located downstream from the first portion but at a point sufficiently close to the first portion where the carbon monoxide is subjected to the high frequency field so as to prevent significant recombination of the constituent products. Since the molecular oxygen and other products are rapidly swept out of the reaction vessel by the cryogenic trap and vacuum pump combination, the freed elemental carbon remains to be deposited as a coating upon the exposed surface of the material which is located in the material handling chamber. The thickness of the carbon coating may be accurately and continuously controlled by adjusting the power of the applied high frequency electromagnetic field and the mass flow rate of the carbon monoxide through the system.

BACKGROUND OF THE INVENTION

This invention relates in general to a process for carbon coating of selected materials and more particularly to a process for decomposing a gaseous carbon compound by means of an electrodeless discharge and utilizing the resultant elemental carbon to provide an accurately controlled carbon coating on the surface of a material.

The technique of the present invention is based on the principle that energy may be efficiently transferred from a high frequency electromagnetic field to a low pressure gaseous compound. As the energy is selectively transferred to the individual atoms of the gaseous compound, the bonds between the various constituents are broken causing the compound to decompose without substantially increasing the temperature of the gas above room temperature. Broadly speaking, the present invention provides a system to decompose a carbon compound in the gaseous state by passing the compound through an intense high frequency electromagnetic radiation field. The free elemental carbon produced by the process is allowed to settle upon the surface of a strategically located material to provide a thin carbon coat while the other constituents are swept out of the activation region.

To deviate for a moment from the brief description, the new method contemplated by the present invention should be contrasted with the most commonly used method, at present, of carbon coating which is vacuum deposition. Carbon coating by vacuum deposition not only requires the maintenance of extremely high temperatures under an absolute vacuum to evaporate the elemental carbon, but, also, such a system suffers from spattering due to unexpected surges in operating voltages resulting in uneven and sometimes even blotchy coated surfaces. In the present invention, since the process is carried out at, relatively speaking, low temperatures, approximately room temperature, and inasmuch as the amount of elemental carbon available for deposition may be finely controlled by varying two easily adjustable parameters, namely, power and mass flow rate, uniform carbon coatings of extremely fine dimensions may be produced.

Accordingly, a primary object of the present invention is the provision of a system for coating a specimen with a uniform layer of carbon at low temperatures.

A further object of the present invention is the decomposition of gaseous carbon compounds by means of a high frequency electromagnetic field and the utilization of the free elemental carbon as a source for coating a desired specimen.

Still a further object of the present invention is the easily adjustable and accurately controlled deposition of a layer of carbon at low temperatures and pressures.

These and other objects and features of this invention will become apparent from the following detailed description when taken in conjunction with the drawing in which:

The figure is an illustration in diagrammatic form of the reaction system in accordance with the principles of the present invention.

With reference now to the drawing and more particularly to FIG. 1 thereof, it will be observed that reference numeral 1 designates a reaction vessel having a decomposition chamber portion 2, generally cylindrical in shape, for decomposition of a gaseous compound and a material handling chamber portion 3, also generally cylindrical in shape, adapted to receive a material to be carbon coated. A container 5 of a gaseous carbon compound, such as carbon monoxide, is connected to the decomposition chamber portion 2 by way of an inlet orifice 9 and a feedline 4. A pressure regulator valve 6 is inserted into feedline 4 upstream from carbon monoxide container 5 to control the pressure of the gas as it passes through the reaction vessel 1. Of course, pressure regulator valve 6 may be provided as an integral part of the carbon monoxide container 5 as is usual in commercial containers of gases. Also inserted into feed line 4 between carbon monoxide container 5 and reaction vessel 1 are a needle valve 7 and a flow meter 8 to adjust the flow rate of the gaseout stream through the system and to continually monitor the resultant flow rate, respectively.

The reaction vessel 1 preferably takes the form of an L shaped configuration with the decomposition chamber being joined at right angles and toward one end of the material handling chamber 3. A high frequency electromagnetic field, preferably within the RF frequency range, is coupled to decomposition chamber 2 by means of a resonant circuit 18 including multi-turn inductive coil 19, which is wound around the outer surface of decomposition chamber 2, and connected in parallel with variable capacitor 20. A crystal controlled oscillator 21 acts as a source of high frequency electromagnetic energy and is connected to the input of resonant circuit 18 by means of shielded wires 23 and 24. Although the illustrated embodiment shows inductive coupling of the high frequency electromagnetic field to reaction vessel 1, it should be understood that capacitive coupling may be used if desired. Variable capacitor 20 may be adjusted to tune the circuit for maximum transfer of energy to the gas stream within the decomposition chamber 2 of the reaction vessel 1. That is to say, the impedance of the resonant circuit, which acts as a load on the oscillator, depends on the pressure of the gas in the reaction vessel 1 as well as to some extent on the exact nature of the contents of the vessel. Thus, by adjusting variable capacitor 20 the resonant circuit may be finely tuned to optimize the power transfer to the gas for efficient operation.

The material handling chamber 3 is provided with an opening 22 at one end thereof for inserting and removing the material or specimen to be carbon coated. Opening 22 in turn is provided with a closure in the form of a cap-like cover 11 which is fitted tightly over the opening 22 after the specimen is inserted to prepare the system for operation. Preferably, in the interest of simplicity and ease of handling, the material to be carbon coated is first placed upon a boat 12 prior to being inserted into material handling chamber 3.

At the end opposite opening 22 the material handling chamber 3 is provided with an outlet orifice 10 which is connected to the atmosphere through a bleed valve 15 and to a vacuum pump (not shown) by way of an outlet line 17. A control valve 16 which as shown diagramatically has three positions, a full open position, partially open and fully closed, is inserted into outlet line 17. Also, immediately downstream from outlet orifice 10 there is provided a catalytic chamber 14 formed of liquid nitrogen or activated charcoal surrounding a U-tube portion to trap out the molecular oxygen product resulting from the decomposition reaction.

In practice, the system is initially pumped down to withdraw air and residual gas from reaction vessel 1 by way of outlet orifice 10 and outlet line 17. The rate of pumpdown may be controlled by setting control valve 16 to one of its three aforementioned positions. For instance, if a fast pumpdown is desired the valve 16 is set to a full open position, while for a slow pumpdown, control valve 16 is set to its fully closed position and bleed valve 15 is opened to by-pass outlet line 17 to the atmosphere.

After the desired pumpdown is obtained, the material 13 to be carbon coated is placed on boat 12 and inserted into material handling chamber 3 through opening 22. Cap 11 is then tightly fitted over opening 22 and pressure regulator valve 6 is opened to initiate a flow of carbon monoxide through feed line 4 to reaction vessel 1. As the gas passes through decomposition chamber 3, oscillator 21 is turned on to supply a high frequency electromagnetic field to the carbon monoxide by means of inductive coil 19. Typically, the oscillator supplies a power output of around 300 watts at a frequency of 13 megahertz.

The individual atoms of the carbon monoxide absorb the energy provided by the high frequency electromagnetic field which is of sufficient intensity to decompose the carbon monoxide into its various constituents. That is, upon absorption of the applied energy the carbon monoxide breaks up to form free elemental carbon (C), carbon dioxide ($CO_2$), molecular oxygen ($O_2$), and ozone ($O_3$) as well as several other oxygen species such as $O_4$ and $O_5$. Of course, depending on the amount of power applied to the reaction vessel, some of the carbon monoxide (CO) remains unreacted. In this regard it should be noted that most of the oxygen species are relatively unimportant since they exhibit an extremely short life time. That is to say, oxygen species such as ozone ($O_3$) are relatively unstable and tend to break up to form the more stable molecular oxygen ($O_2$) or combine with carbon monoxide molecules to form the more stable gas, carbon dioxide ($CO_2$).

Upon separation from the gas compound, small numbers of the free elemental carbon atoms, say three or four carbon atoms, tend to associate and behave in the nature of a solid. As a solid the carbon atoms acquire or take on a strong affinity for the exposed surface of the material 13. It follows that as the decomposed gas passes through material handling chamber 3 of reaction vessel 1, the carbon atoms settle or deposit on the surface of the material to form a carbon coat. It is important to recall in this connection that the material to be coated is placed in material handling chamber 3 at a point sufficiently close to the decomposition chamber 2 to avoid significant recombination of the carbon and oxygen atoms to provide the maximum amount of free elemental carbon for deposition.

On the other hand, products, other than elemental carbon, resulting from the exposure of the carbon monoxide to an electromagnetic energy field remain in the gaseous state and are rapidly and continuously swept out of reaction vessel 1 by the combined action of catalytic trap 14 and the exhaust pump. By virtue of the previously discussed strong affinity of the carbon atoms for a solid surface in conjunction with the latter discussed exhaust action, the atoms of carbon remain in the material handling chamber 3 and are deposited on the exposed surface of the material. It is significant to note that the final thickness of the carbon layer may be easily and accurately controlled by adjusting the mass flow rate of the carbon monoxide through the system and the power applied to the reaction vessel 1 or both. For instance, the thickness of the layer may be increased by increasing the amount of power applied to the reaction vessel.

What is claimed is:

1. A method for providing a layer of carbon on the surface of a material comprising the steps of: generating a stream of a carbon monoxide; subjecting said stream to a high frequency electromagnetic field of sufficient intensity to decompose said carbon monoxide to yield elemental carbon in addition to other products without substantially increasing the temperature of said stream above room temperature; exposing said material to be carbon coated to said decomposed gaseous stream at a point downstream from the high frequency electromagnetic field; and removing said other constituents leaving said elemental carbon to be deposited on the specimen.

References Cited

UNITED STATES PATENTS

| | | | |
|---|---|---|---|
| 2,553,944 | 5/1951 | Schlesman | 204—162 |
| 2,877,138 | 3/1959 | Vodonik | 219—10.41 X |
| 3,067,308 | 12/1962 | McBrien | 219—10.75 |
| 3,410,776 | 11/1968 | Bersin | 204—157.1 X |

ANDREW G. GOLIAN, Primary Examiner

U.S. Cl. X.R.

23—209.1; 117—93.2; 204—157.1